US012646817B2

(12) United States Patent

Modak et al.

(10) Patent No.: US 12,646,817 B2

(45) Date of Patent: Jun. 2, 2026

(54) MOUNTING BRACKET FOR ANTENNA

(71) Applicant: Outdoor Wireless Networks LLC,
Claremont, NC (US)

(72) Inventors: Chaitanya Modak, Chiplun (IN);
Madivalappa Sogalad, Dharwad (IN);
Venkateswara Rao Polineni, Ongole
(IN); Ravi Kiran Reddy Tadiparthi,
Guntur (IN)

(73) Assignee: Outdoor Wireless Networks LLC,
Richardson, TX (US)

( * ) Notice: Subject to any disclaimer, the term of this
patent is extended or adjusted under 35
U.S.C. 154(b) by 0 days.

(21) Appl. No.: 18/664,713

(22) Filed: May 15, 2024

(65) Prior Publication Data

US 2024/0396201 A1 Nov. 28, 2024

Related U.S. Application Data

(60) Provisional application No. 63/504,240, filed on May
25, 2023.

(51) Int. Cl.
H01Q 1/12 (2006.01)
F16B 2/12 (2006.01)
(52) U.S. Cl.
CPC ............. H01Q 1/1228 (2013.01); F16B 2/12
(2013.01)
(58) Field of Classification Search
CPC ..... F16B 2/04; F16B 2/06; F16B 2/12; H01Q
1/1228

USPC ............. 248/229, 12, 229.14, 229.15, 229.2,
248/229.22, 229.24, 229.25
See application file for complete search history.

(56) References Cited

U.S. PATENT DOCUMENTS

| | | | |
|---|---|---|---|
| 7,106,273 | B1 * | 9/2006 | Brunson ................ H01Q 1/246 |
| | | | 343/890 |
| 2016/0211569 | A1 * | 7/2016 | Skrepcinski ......... H01Q 1/1228 |
| 2021/0005950 | A1 * | 1/2021 | Ojha .................... H01Q 1/1228 |
| 2021/0376444 | A1 * | 12/2021 | Heath ..................... E04G 5/045 |
| 2022/0102830 | A1 * | 3/2022 | Liu ....................... H01Q 1/1228 |
| 2022/0359973 | A1 * | 11/2022 | Lapalme .............. H01Q 1/1242 |
| 2023/0098517 | A1 * | 3/2023 | Wang ................... H01Q 1/1228 |
| | | | 248/219.4 |
| 2023/0399859 | A1 * | 12/2023 | Ai ........................... E04G 1/152 |
| 2024/0178543 | A1 * | 5/2024 | Kondaveeti .......... H01Q 1/1264 |
| 2024/0363992 | A1 * | 10/2024 | Haines ................. H01Q 1/1228 |

* cited by examiner

*Primary Examiner* — Alfred J Wujciak

(74) *Attorney, Agent, or Firm* — Myers Bigel, P.A.

(57) ABSTRACT

A mounting bracket for an antenna includes clamp jaws that
are adapted to be arranged around a monopole and are
adjustably couplable with each other to clamp the monopole.
Each clamp jaw comprises a first plate, a second plate, and
a backplate that couples the first plate to the second plate and
defines holes therein. The mounting bracket further com-
prises at least two mounting fasteners, and each mounting
fastener is adapted to extend through corresponding holes of
the adjacent clamp jaws and is configured to be tightened or
loosened to move the clamp jaws toward or away from each
other, respectively. The mounting bracket furthermore com-
prises adaptor bodies having a first plate and a second plate.
The first plate defines first apertures therein and is couplable
to a corresponding clamp jaw via fasteners inserted through
the first apertures in the first plate.

19 Claims, 10 Drawing Sheets

MOUNTING BRACKET FOR ANTENNA

CROSS-REFERENCE TO RELATED APPLICATION

The present application claims priority from and the benefit of U.S. Provisional Patent Application No. 63/504,240, filed May 25, 2023, the disclosure of which is incorporated herein by reference in its entirety.

FIELD OF THE INVENTION

The present disclosure relates to communication systems and, in particular, to mounting bracket of wireless antennas.

BACKGROUND OF THE INVENTION

The information in this section merely provides background information related to the present disclosure and may not constitute prior art(s) for the present disclosure.

Cellular communications systems are used to provide wireless communications to fixed and mobile subscribers (herein "users"). A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a portion thereof that is typically referred to as a "sector." The base station antenna may be designed to have maximum gain levels throughout its pre-defined coverage area, and it is typically desirable that the base station antenna has much lower gain levels outside of the coverage area to reduce interference between sectors/cells.

In one common configuration, a hexagonally-shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In a tri-sector antenna arrangement, such as that described above, brackets are typically used to mount each antenna to the raised structure. Typically, each antenna is mounted with its own set of two or more mounting brackets. It may be desirable to provide alternative mounting arrangements, particularly for smaller antennas that are mounted to monopoles. Also, tri-sector antenna mount kits facilitate mounting three antennas to the single monopole and install a shroud outside of the tri-sector antennas. However, a total outer diameter of the entire tri-sector antennas assembly becomes large and bulky, and thus the known tri-sector antenna assemblies do not cater to the requirement for light weight antennas.

SUMMARY OF THE INVENTION

The one or more shortcomings of the prior art are overcome by the system as claimed, and additional advantages are provided through the provision of the system as claimed in the present disclosure. Additional features and advantages are realized through the techniques of the present disclosure. Other embodiments and aspects of the disclosure are described in detail herein and are considered a part of the claimed disclosure.

Pursuant to embodiments of the present disclosure, in an aspect, a mounting bracket for an antenna is disclosed. The mounting bracket comprises at least two clamp jaws adapted to be arranged around a monopole and adjustably couplable with each other to clamp and unclamp the monopole. Each of the at least two clamp jaws comprises a first plate, a second plate, and a backplate that couples the first plate to the second plate and defines holes therein. The mounting bracket further comprises at least two mounting fasteners, and each mounting fastener of the at least two mounting fasteners is adapted to extend through corresponding holes of the adjacent clamp jaws and configured to be tightened or loosened to move the at least two clamp jaws toward or away from each other, respectively.

In another non-limiting embodiment of the present disclosure, the first plate and the second plate of the at least two clamp jaws define a toothed concave edge.

In another non-limiting embodiment of the present disclosure, the mounting bracket comprises at least two adaptor bodies. Each adaptor body of the at least two adaptor bodies comprises a first plate and a second plate coupled to the first plate. The first plate of the adaptor body defines first apertures therein and is couplable to a corresponding clamp jaw via fasteners inserted through the first apertures in the first plate of the adaptor body.

In another non-limiting embodiment of the present disclosure, the first apertures in the first plate of the adaptor body are slots.

In another non-limiting embodiment of the present disclosure, the first apertures in the first plate of the adaptor body facilitate moving the corresponding clamp jaw with respect to the adaptor body upon tightening and loosening of the mounting fasteners.

In another non-limiting embodiment of the present disclosure, the second plate of the adaptor body defines second apertures and is adapted to be coupled to the antenna via fasteners inserted through the second apertures in the second plate of the adaptor body.

In another non-limiting embodiment of the present disclosure, the second apertures in the second plate of the adaptor body are slots, holes or protuberances.

In another non-limiting embodiment of the present disclosure, the mounting bracket comprises a hex plate having a first arm, a second arm and a spine spanning the first arm and the second arm. The first arm, the second arm, and the spine create a monopole receiving space. The at least two clamp jaws are attached to each of the first arm and the second arm via fasteners inserted through apertures in the first arm and the second arm.

In another non-limiting embodiment of the present disclosure, the apertures in the first arm and the second arm are slots.

In another non-limiting embodiment of the present disclosure, the slots in the first arm and the second arm comprise two slots in each of the first arm and the second arm.

In another non-limiting embodiment of the present disclosure, the slots in the first arm are collinear, and the slots in the second arm are collinear.

In another non-limiting embodiment of the present disclosure, the apertures in the first arm and the second arm of the hex plate facilitate moving the at least two clamp jaws with respect to the hex plate.

In another non-limiting embodiment of the present disclosure, the mounting bracket comprises three adaptor bodies. Each adaptor body of the three adaptor bodies comprises a first plate and a second plate coupled to the first plate. The first plate defines first apertures therein and is couplable to a corresponding of first, second and third flanges that extend downwardly from the first arm, the second arm, and the spine, respectively, of the hex plate.

In another non-limiting embodiment of the present disclosure, the first plate of the adaptor body is coupled to the corresponding of first, second and third flanges via fasteners inserted through the first apertures in the first plate of the adaptor body.

In another non-limiting embodiment of the present disclosure, the first apertures in the first plate of the adaptor body are slots.

In another non-limiting embodiment of the present disclosure, the second plate of the adaptor body defines second apertures and is adapted to be coupled to the antenna via fasteners inserted through the second apertures in the second plate of the adaptor body.

In another non-limiting embodiment of the present disclosure, the second apertures in the second plate of the adaptor body are slots, holes or protuberances.

Pursuant to embodiments of the present disclosure, in another aspect, a mounting bracket for an antenna is disclosed. The mounting bracket comprises three clamp jaws adapted to be arranged around a monopole and adjustably couplable with each other to clamp and unclamp the monopole. Each of the three clamp jaws comprises a first plate, a second plate, and a backplate that couples the first plate to the second plate and defines holes therein. The mounting bracket further comprises three mounting fasteners. Each mounting fastener of the three mounting fasteners is adapted to extend through corresponding holes of the adjacent clamp jaws and configured to be tightened or loosened to move the three clamp jaws toward or away from each other, respectively. The mounting bracket furthermore comprises three adaptor bodies, and each adaptor body of the three adaptor bodies comprises a first plate and a second plate coupled to the first plate. The first plate of the adaptor body defines first apertures therein and is couplable to a corresponding clamp jaw via fasteners inserted through the first apertures in the first plate of the adaptor body.

In another non-limiting embodiment of the present disclosure, the first plate and the second plate of the three clamp jaws define a toothed concave edge.

In another non-limiting embodiment of the present disclosure, the first apertures in the first plate of the adaptor body are slots.

In another non-limiting embodiment of the present disclosure, the first apertures in the first plate of the adaptor body facilitate moving the corresponding clamp jaw with respect to the adaptor body upon tightening and loosening of the mounting fasteners.

In another non-limiting embodiment of the present disclosure, the second plate of the adaptor body defines second apertures and is adapted to be coupled to the antenna via fasteners inserted through the second apertures in the second plate of the adaptor body.

In another non-limiting embodiment of the present disclosure, the second apertures in the second plate of the adaptor body are slots, holes or protuberances.

In another non-limiting embodiment of the present disclosure, the mounting fasteners comprise nut and bolt arrangements.

In another non-limiting embodiment of the present disclosure, the mounting bracket in combination with first, second and third antennas mounted to, respectively, one of the three adaptor bodies of the mounting bracket.

In another non-limiting embodiment of the present disclosure, the combination of the mounting bracket and the first, second, and third antennas is in further combination with the monopole, the three clamp jaws engaging the monopole.

In another non-limiting embodiment of the present disclosure, the mounting bracket is adjustable to accommodate monopoles having a diameter varying in a range of 3.5 inches to 6.625 inches.

In another non-limiting embodiment of the present disclosure, each of the three clamp jaws is a triangular clamp jaw in which the first plate and the second plate of the three clamp jaws define a toothed concave edge.

In another non-limiting embodiment of the present disclosure, the backplate of each of the three clamp jaws comprises two outwardly extending flanges that define the holes for receiving the mounting fasteners.

Pursuant to embodiments of the present disclosure, in yet another aspect, a mounting bracket for an antenna is disclosed. The mounting bracket comprises two clamp jaws adapted to be arranged around a monopole and adjustably couplable with each other to clamp and unclamp the monopole. Each of the two clamp jaws comprises a first plate, a second plate, and a backplate that couples the first plate to the second plate and defines holes therein. The mounting bracket further comprises two mounting fasteners. Each mounting fastener of the two mounting fasteners is adapted to extend through corresponding holes of the two clamp jaws and is configured to be tightened or loosened to move the two clamp jaws toward or away from each other, respectively. The mounting bracket furthermore comprises a hex plate having a first arm, a second arm and a spine spanning the first arm and the second arm. The first arm, the second arm, and the spine create a monopole receiving space. The two clamp jaws are attached to each of the first arm and the second arm via fasteners inserted through apertures in the first arm and the second arm. Further, the mounting bracket comprises three adaptor bodies. Each adaptor body of the three adaptor bodies comprises a first plate and a second plate coupled to the first plate. The first plate of the adaptor body defines first apertures therein and is couplable to a corresponding of first, second and third flanges that extend downwardly from the first arm, the second arm, and the spine, respectively, of the hex plate.

In another non-limiting embodiment of the present disclosure, the first plate and the second plate of the two clamp jaws define a toothed concave edge.

In another non-limiting embodiment of the present disclosure, the apertures in the first arm and the second arm of the hex plate are slots.

In another non-limiting embodiment of the present disclosure, the slots in the first arm and the second arm comprise two slots in each of the first arm and the second arm.

In another non-limiting embodiment of the present disclosure, the slots in the first arm are collinear, and the slots in the second arm are collinear.

In another non-limiting embodiment of the present disclosure, the apertures in the first arm and the second arm of the hex plate facilitate moving the two clamp jaws with respect to the hex plate.

In another non-limiting embodiment of the present disclosure, the first plate of the adaptor body is coupled to the corresponding of first, second and third flanges via fasteners inserted through the first apertures in the first plate of the adaptor body.

In another non-limiting embodiment of the present disclosure, the first apertures in the first plate of the adaptor body are slots.

In another non-limiting embodiment of the present disclosure, the second plate of the adaptor body defines second apertures and is adapted to be coupled to the antenna via fasteners inserted through the second apertures in the second plate of the adaptor body.

In another non-limiting embodiment of the present disclosure, the second apertures in the second plate of the adaptor body are slots, holes or protuberances.

In another non-limiting embodiment of the present disclosure, the mounting fasteners comprise nut and bolt arrangements.

In another non-limiting embodiment of the present disclosure, the mounting bracket in combination with first, second and third antennas mounted to, respectively, one of the three adaptor bodies of the mounting bracket.

In another non-limiting embodiment of the present disclosure, the combination of the mounting bracket and the first, second, and third antennas is in further combination with the monopole, the two clamp jaws engaging the monopole.

In another non-limiting embodiment of the present disclosure, the mounting bracket is adjustable to accommodate monopoles having a diameter varying in a range of 3.5 inches to 6.625 inches.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristics of the disclosure are set forth in the description. The disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
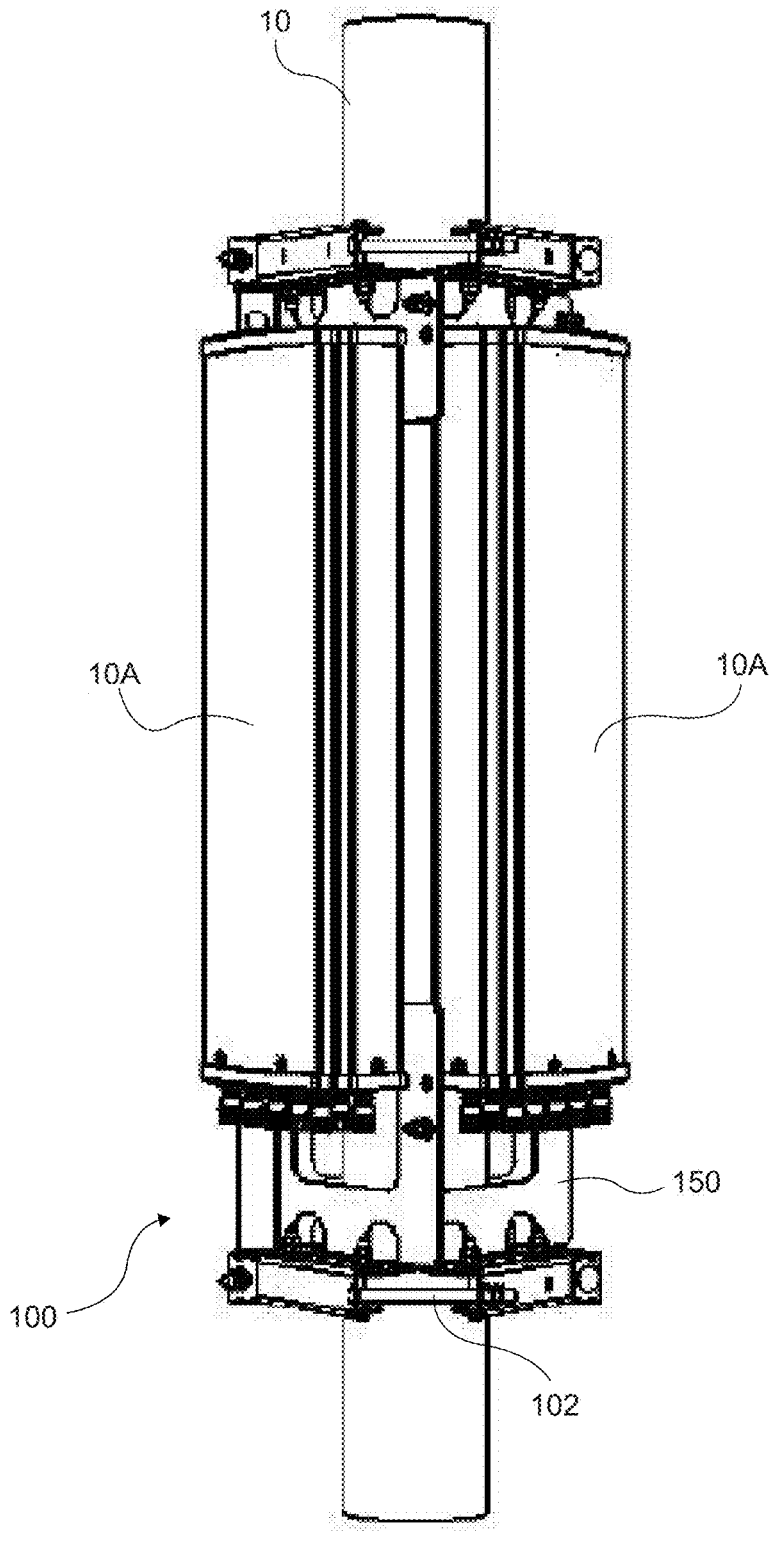
FIG. 1 is a side view of an exemplary tri-sector antenna assembly mounted on a monopole by a mounting bracket, in accordance with a first embodiment of the present disclosure.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION OF EMBODIMENTS

While the disclosure is susceptible to various modifications and alternative forms, specific embodiments thereof have been shown by way of example in FIGS. 1 to 10 and will be described in detail below. It should be understood, however that it is not intended to limit the disclosure to the particular forms disclosed, but on the contrary, the disclosure is to cover all modifications, equivalents, and alternatives falling within the scope of the disclosure as defined by the appended claims.

Before describing detailed embodiments, it may be observed that the present disclosure is directed to a mounting bracket for an antenna. It is to be noted that a person skilled in the art can be motivated from the present disclosure and modify the various constructions of the mounting bracket. However, such modifications should be construed within the scope of the present disclosure. Accordingly, the drawings are showing only those specific details that are pertinent to understanding the embodiments of the present disclosure so as not to obscure the disclosure with details that will be readily apparent to those of ordinary skill in the art having benefit of the description herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover non-exclusive inclusions, such that a device that comprises a list of components does not include only those components but may include other components not expressly listed or inherent to such device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

Pursuant to an embodiment of the present disclosure, in an aspect, a mounting bracket for an antenna is disclosed. The mounting bracket comprises at least two clamp jaws adapted to be arranged around a monopole and adjustably couplable with each other to clamp and unclamp the monopole. Each of the at least two clamp jaws comprises a first plate, a second plate, and a backplate that couples the first plate to the second plate and defines holes therein. The mounting bracket further comprises at least two mounting fasteners, and each mounting fastener of the at least two mounting fasteners is adapted to extend through corresponding holes of the adjacent clamp jaws and configured to be tightened or loosened to move the at least two clamp jaws toward or away from each other, respectively. Further, the first plate and the second plate of the at least two clamp jaws define a toothed concave edge.

In an embodiment, the mounting bracket comprises at least two adaptor bodies. Each adaptor body of the at least two adaptor bodies comprises a first plate and a second plate coupled to the first plate. The first plate of the adaptor body defines first apertures therein and is couplable to a corresponding clamp jaw via fasteners inserted through the first apertures in the first plate of the adaptor body. The first apertures in the first plate of the adaptor body are slots. Further, the first apertures in the first plate of the adaptor body facilitate moving the corresponding clamp jaw with respect to the adaptor body upon tightening and loosening of the mounting fasteners. Also, the second plate of the adaptor body defines second apertures and is adapted to be coupled to the antenna via fasteners inserted through the second apertures in the second plate of the adaptor body. The second apertures in the second plate of the adaptor body are slots, holes or protuberances.

In another embodiment, the mounting bracket comprises a hex plate having a first arm, a second arm and a spine spanning the first arm and the second arm. The first arm, the second arm, and the spine create a monopole receiving space. The at least two clamp jaws are attached to each of the first arm and the second arm via fasteners inserted through apertures in the first arm and the second arm. The apertures in the first arm and the second arm are slots. The slots in the first arm and the second arm comprise two slots in each of the first arm and the second arm. Also, the slots in the first arm are collinear, and the slots in the second arm are collinear. The apertures in the first arm and the second arm of the hex plate facilitate moving the at least two clamp jaws with respect to the hex plate. Further, the mounting bracket comprises three adaptor bodies. Each adaptor body of the three adaptor bodies comprises a first plate and a second plate coupled to the first plate. The first plate of the adaptor body defines first apertures therein and is couplable to a corresponding of first, second and third flanges that extend downwardly from the first arm, the second arm, and the spine, respectively, of the hex plate. The first plate of the adaptor body is coupled to the corresponding of first, second and third flanges via fasteners inserted through the first apertures in the first plate of the adaptor body. The first apertures in the first plate of the adaptor body are slots. Also, the second plate of the adaptor body defines second apertures and is adapted to be coupled to the antenna via fasteners inserted through the second apertures in the second plate of the adaptor body. The second apertures in the second plate of the adaptor body are slots, holes or protuberances.

Pursuant to an embodiment of the present disclosure, in another aspect, a mounting bracket for an antenna is disclosed. The mounting bracket comprises three clamp jaws adapted to be arranged around a monopole and adjustably couplable with each other to clamp and unclamp the monopole. Each of the three clamp jaws comprises a first plate, a second plate, and a backplate that couples the first plate to the second plate and defines holes therein. The mounting bracket further comprises three mounting fasteners. Each mounting fastener of the three mounting fasteners is adapted to extend through corresponding holes of the adjacent clamp jaws and configured to be tightened or loosened to move the three clamp jaws toward or away from each other, respectively. The mounting bracket furthermore comprises three adaptor bodies, and each adaptor body of the three adaptor bodies comprises a first plate and a second plate coupled to the first plate. The first plate of the adaptor body defines first apertures therein and is couplable to a corresponding clamp jaw via fasteners inserted through the first apertures in the first plate of the adaptor body. The first plate and the second plate of the three clamp jaws define a toothed concave edge.

In an embodiment, the first apertures in the first plate of the adaptor body are slots. The first apertures in the first plate of the adaptor body facilitate moving the corresponding clamp jaw with respect to the adaptor body upon tightening and loosening of the mounting fasteners. Further, the second plate of the adaptor body defines second apertures and is adapted to be coupled to the antenna via fasteners inserted through the second apertures in the second plate of the adaptor body. The second apertures in the second plate of the adaptor body are slots, holes or protuberances. Moreover, the mounting fasteners comprise nut and bolt arrangements.

In another embodiment, the mounting bracket in combination with first, second and third antennas is mounted to, respectively, one of the three adaptor bodies of the mounting bracket. The combination of the mounting bracket and the first, second, and third antennas is in further combination with the monopole, the three clamp jaws engaging the monopole. Further, the mounting bracket is adjustable to accommodate monopoles having a diameter varying in a range of 3.5 inches to 6.625 inches.

In accordance with the present disclosure, each of the three clamp jaws is a triangular clamp jaw in which the first plate and the second plate of the three clamp jaws define a toothed concave edge. Further, the backplate of each of the three clamp jaws comprises two outwardly extending flanges that define the holes for receiving the mounting fasteners.

Pursuant to an embodiment of the present disclosure, in yet another aspect, a mounting bracket for an antenna is disclosed. The mounting bracket comprises two clamp jaws adapted to be arranged around a monopole and adjustably couplable with each other to clamp and unclamp the monopole. Each of the two clamp jaws comprises a first plate, a second plate, and a backplate that couples the first plate to the second plate and defines holes therein. The mounting bracket further comprises two mounting fasteners. Each mounting fastener of the two mounting fasteners is adapted to extend through corresponding holes of the two clamp jaws and is configured to be tightened or loosened to move the two clamp jaws toward or away from each other, respectively. The mounting bracket furthermore comprises a hex plate having a first arm, a second arm and a spine spanning the first arm and the second arm. The first arm, the second arm, and the spine create a monopole receiving space. The two clamp jaws are attached to each of the first arm and the second arm via fasteners inserted through apertures in the first arm and the second arm. Further, the mounting bracket comprises three adaptor bodies. Each adaptor body of the three adaptor bodies comprises a first plate and a second plate coupled to the first plate. The first plate of the adaptor body defines first apertures therein and is couplable to a corresponding of first, second and third flanges that extend downwardly from the first arm, the second arm, and the spine, respectively, of the hex plate. Also, the first plate and the second plate of the two clamp jaws define a toothed concave edge.

The apertures in the first arm and the second arm are slots. The slots in the first arm and the second arm comprise two slots in each of the first arm and the second arm. Further, the slots in the first arm are collinear, and the slots in the second arm are collinear. The apertures in the first arm and the second arm of the hex plate facilitate moving the two clamp jaws with respect to the hex plate.

In an embodiment, the first plate of the adaptor body is coupled to the corresponding of first, second and third flanges via fasteners inserted through the first apertures in the first plate. The first apertures in the first plate of the adaptor body are slots. Further, the second plate of the adaptor body defines second apertures and is adapted to be coupled to the antenna via fasteners inserted through the second apertures in the second plate of the adaptor body. The second apertures in the second plate of the adaptor body are slots, holes or protuberances. Moreover, the mounting fasteners comprise nut and bolt arrangements.

In another embodiment, the mounting bracket in combination with first, second and third antennas is mounted to, respectively, one of the three adaptor bodies of the mounting bracket. The combination of the mounting bracket and the first, second, and third antennas is in further combination with the monopole, the two clamp jaws engaging the monopole. Further, the mounting bracket is adjustable to accommodate monopoles having a diameter varying in a range of 3.5 inches to 6.625 inches.

It is to be understood that the aspects and embodiments of the disclosure described above may be used in any combination with each other. Several of the aspects and embodiments may be combined together to form a further embodiment of the disclosure.

Reference will now be made to the exemplary embodiments of the disclosure, as illustrated in the accompanying drawings. Wherever possible same numerals will be used to refer to the same or like parts.

Embodiments of the disclosure are described in the following paragraphs with reference to FIGS. 1 to 10. In FIGS. 1 to 10, the same element or elements which have same functions are indicated by the same reference signs.

FIG. 1 is a side view of an exemplary mounting bracket 100, according to a first embodiment of the present disclosure, that has been utilized for mounting three antennas 10A, for example, three base station antennas, to a support structure 10, for example, a monopole 10. The support structure 10 may be defined as a pole, or any similar vertical structure rigidly fixed to a surface. The mounting bracket 100 comprises a plurality of clamp jaws 110, and each clamp jaw 110 is adapted to connect to a rear surface of a respective antenna 10A. The rear surface of the antenna 10A may be defined as a surface facing the support structure 10, i.e., the rear surface is the radially inward surface of the antenna 10A. Without deviating from the scope of the present disclosure, the mounting bracket 100 is adapted to be coupled to a top end or a bottom end of the antennas 10A. In the illustrated exemplary embodiment of FIG. 1, two mounting brackets 100 are shown, one of which is connected to the top end of the antennas 10A and the other is connected to the bottom end of the antennas 10A. In accordance with the present disclosure, the mounting brackets 100 are removably connected to the antennas 10A.

Figure 2:
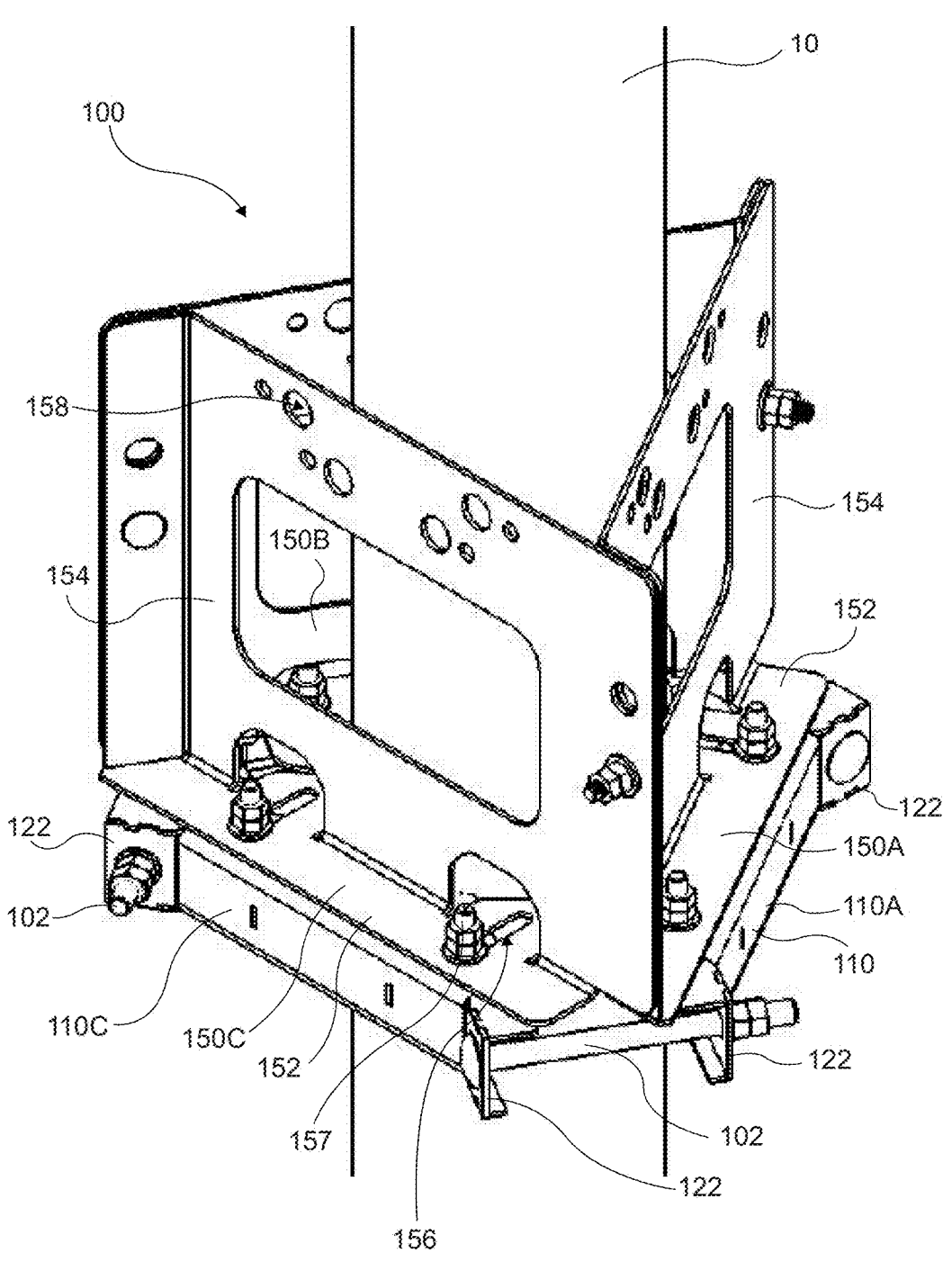
FIG. 2 is a perspective view of the mounting bracket of FIG. 1 comprising clamp jaws and adaptor bodies coupled to each other, in accordance with an embodiment of the present disclosure.
Figure 3:
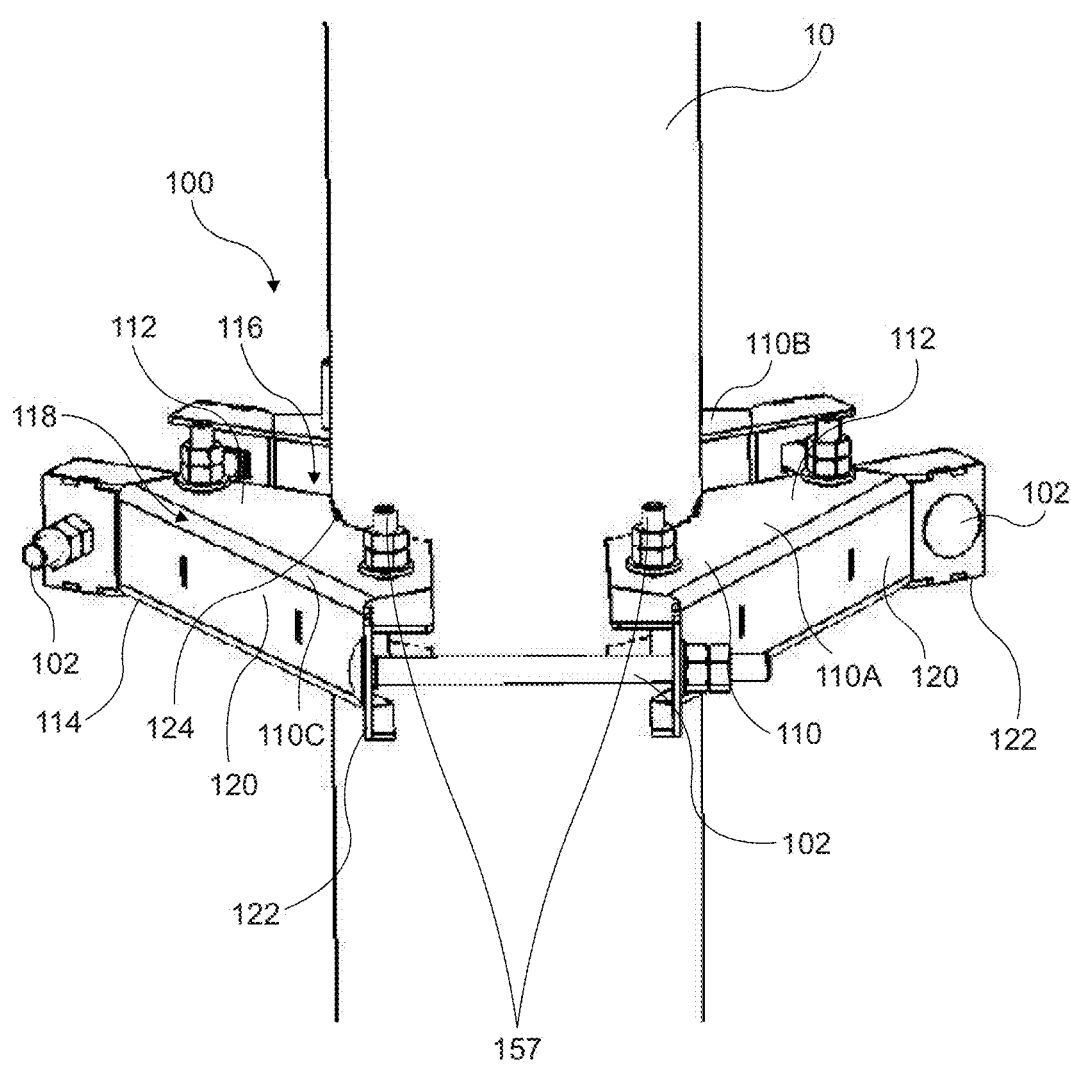
FIG. 3 is a perspective view of the clamp jaws of FIG. 2 mounted on the monopole, in accordance with an embodiment of the present disclosure.
Figure 4:
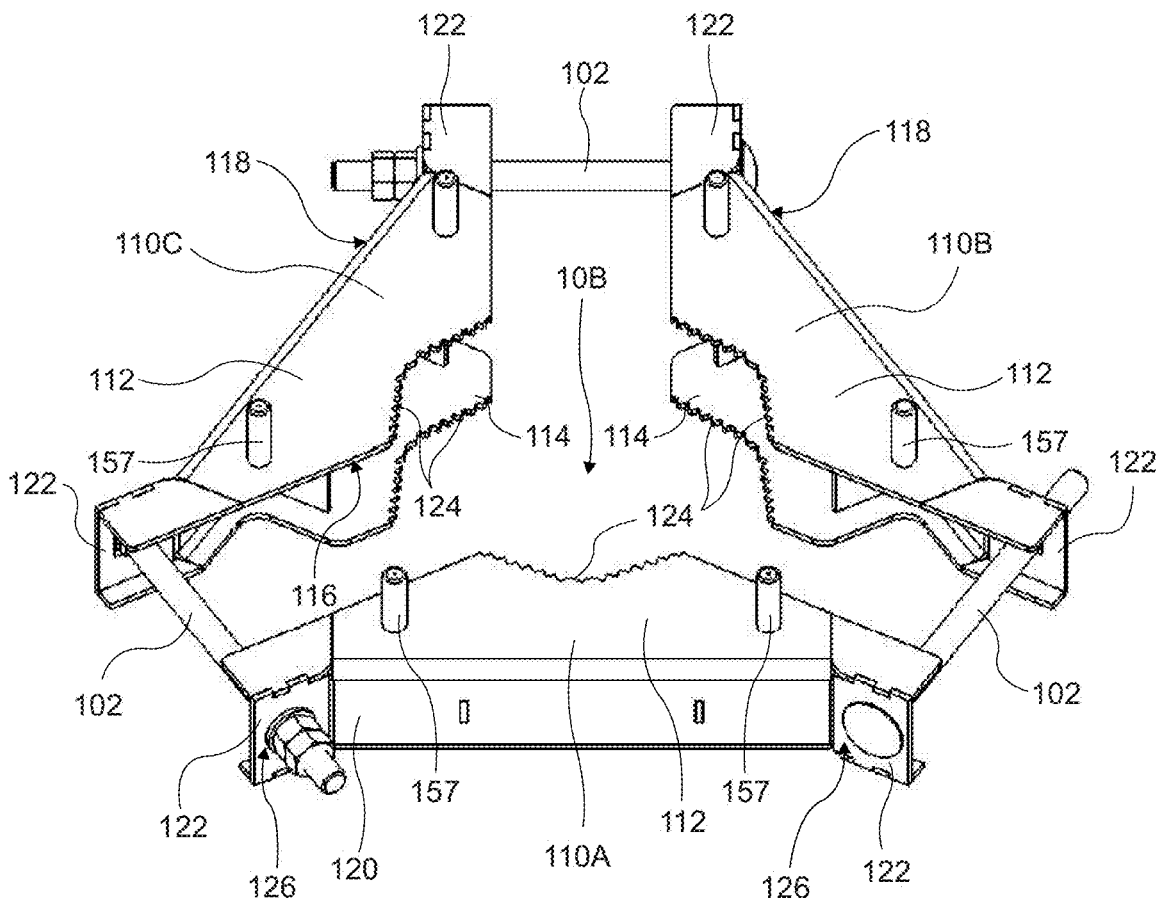
FIG. 4 is a top perspective view of the clamp jaws of FIG. 3 coupled to each other via mounting fasteners, in accordance with an embodiment of the present disclosure.

FIG. 2 illustrates the perspective view of the mounting bracket 100 mounted to the support structure/monopole 10. As shown in FIGS. 2, 3 and 4, the mounting bracket 100 comprises three clamp jaws 110A, 110B, 110C that are adapted to be arranged around the monopole 10 and are adapted to be adjustably couplable with each other in order to clamp and unclamp the monopole 10. The mounting bracket 100 further comprises three mounting fasteners 102, as shown in FIGS. 2, 3 and 4. The mounting fasteners 102 are configured to extend through the adjacent clamp jaws 110 of the three clamp jaws 110A, 110B, 110C. The mounting fasteners 102 are configured to be tightened and loosened to the move the three clamp jaws 110A, 110B, 110C toward and away from each other, respectively. For example, the mounting fasteners 102 may be tightened such that the three clamp jaws 110A, 110B, 110C move toward each other and toward the monopole 10 in order to clamp the monopole 10. Similarly, the mounting fasteners 102 may be loosened such that the three clamp jaws 110A, 110B, 110C are free to move away from each other and away from the monopole 10 in order to unclamp the monopole 10.

Figure 5:
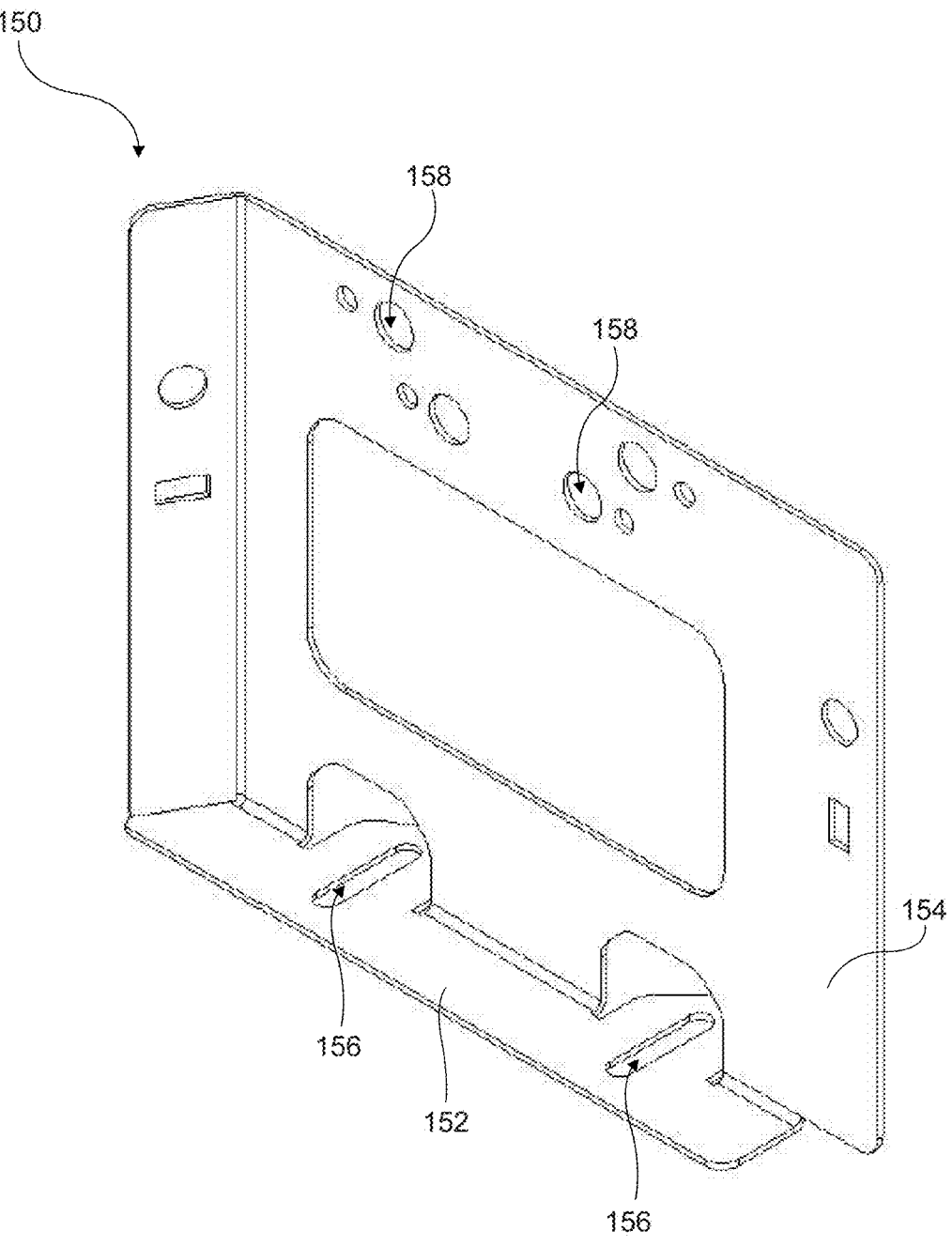
FIG. 5 is a perspective view of one adaptor body of the mounting bracket of FIG. 2, in accordance with an embodiment of the present disclosure.

With reference to FIGS. 2 and 5, the mounting bracket 110 further comprises three adaptor bodies 150, 150A, 150B, 150C, each adaptor body 150 of the three adaptor bodies 150A, 150B, 150C is configured to couple the antenna 10A to a respective clamp jaw 110 of the mounting bracket 100. In accordance with the present disclosure, a first portion of the adaptor body 150 is adapted to be coupled to the clamp jaw 110 and a second portion of the adaptor body 150 is adapted to be coupled to the antenna 10A.

Referring again to FIGS. 2, 3 and 4, each clamp jaw 110 of the three clamp jaws 110A, 110B, 110C may be embodied as a triangular clamp jaw. Each clamp jaw 110 comprises a first plate 112 and a second plate 114 arranged below the first plate 112. The first plate 112 and the second plate 114 have a first end 116 and a second end 118 opposite to the first end 116. The clamp jaw 110 further comprises a backplate 120 that extends from the second end 118 of the first plate 112 to the second end 118 of the second plate 114 such that the backplate 120 couples the first plate 112 to the second plate 114. In an embodiment, the backplate 120 of each clamp jaw 110 may comprise flanges 122 extending outwardly from opposing sides of the backplate 120. Further, the first plate 112 and the second plate 114 of each clamp jaw 110 define a toothed concave edge 124 at the first ends 116 of the first plate 112 and the second plate 114. Without deviating from the scope of the present disclosure, the toothed concave edges 124 of the first plate 112 and the second plate 114 are adapted to engage and/or grip the support structure/monopole 10 for clamping the mounting bracket 100 on the monopole 10, as shown in FIGS. 2 and 3.

In accordance with the present disclosure, the backplate 120 of each clamp jaw 110 defines holes 126 therein that are adapted to receive the mounting fasteners 102 therein for arranging the clamp jaws 110A, 110B, 110C around the monopole 10 and adjustably coupling the clamp jaws 110A, 110B, 110C with each other. In an embodiment, the outwardly extending flanges 122 of the backplate 120 define holes 126 therein for receiving the mounting fasteners 102.

Still referring to FIGS. 2, 3 and 4, the mounting bracket 100 comprises the mounting fasteners 102. The mounting fasteners 102 are configured to extend through the holes 126 defined in the backplate 120 of the adjacent clamp jaws 110 of the three clamp jaws 110A, 110B, 110C in order to adjustably couple the clamp jaws 110A, 110B, 110C around the monopole 10. In an embodiment, the mounting fasteners 102 are configured to extend through the holes 126 defined in the flanges 122 of the backplate 120 of the adjacent clamp jaws 110 to adjustably couple the clamp jaws 110A, 110B, 110C around the monopole 10. As explained in the preceding paragraphs, the mounting fasteners 102 are configured to be tightened and loosened to the move the three clamp jaws 110A, 110B, 110C toward and away from each other, respectively. For example, the mounting fasteners 102 may be tightened such that the three clamp jaws 110A, 110B, 110C move toward each other and toward the monopole 10 in order to clamp the monopole 10. Similarly, the mounting fasteners 102 may be loosened such that the three clamp jaws 110A, 110B, 110C are free to move and may be moved away from each other and away from the monopole 10 in order to unclamp the monopole 10. In an embodiment of the present disclosure, the mounting fasteners 102 comprise nut and bolt arrangements. In another embodiment, the mounting fasteners 102 may comprise a combination of a nut, a bolt, a cushion or split washer, and a washer for effective fastening of the clamp jaws 110A, 110B, 110C of the mounting bracket 100 around the monopole 10. In an embodiment of the present disclosure, the mounting fasteners 102 may be tightened and/or loosened such that a monopole receiving space 10B created between the toothed concave edges 124 of the clamp jaws 110A, 110B, 110C can be varied to accommodate the monopole 10 of different diameters. For example, the mounting bracket 100 is adjustable to accommodate monopoles having a diameter varying in a range of 3.5 inches to 6.625 inches.

Figure 6:
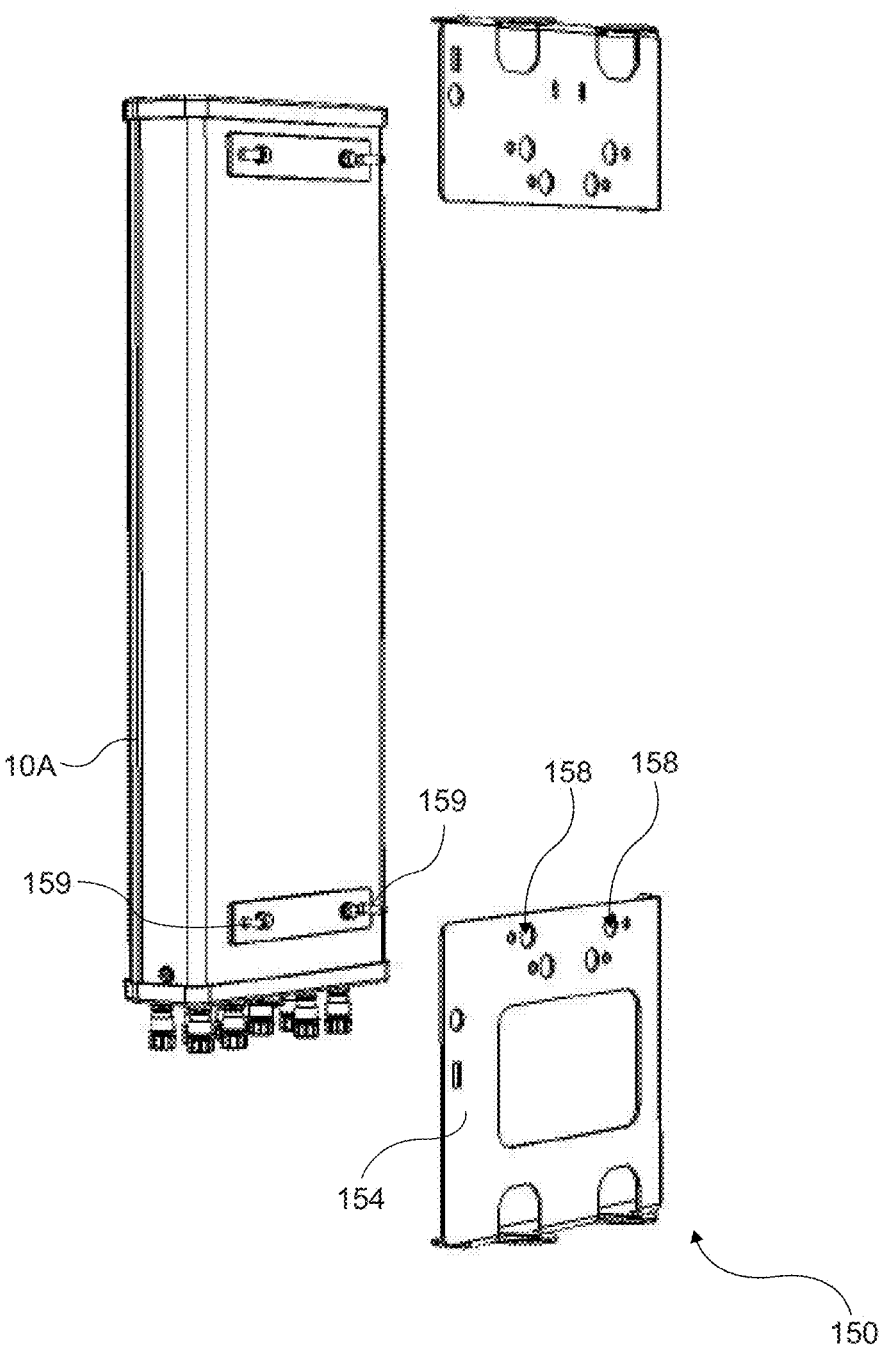
FIG. 6 is an exploded view of an exemplary antenna and the adaptor bodies of FIG. 5, in accordance with an embodiment of the present disclosure.

With reference to FIGS. 2, 5 and 6, the mounting bracket 100 further comprises the three adaptor bodies 150, 150A, 150B, 150C. Each adaptor body 150 of the three adaptor bodies 150A, 150B, 150C is configured to couple the antenna 10A to a respective clamp jaw 110 of the mounting bracket 100. As shown in FIG. 5, the adaptor body 150 comprises a first plate 152 and a second plate 154. The second plate 154 is arranged substantially perpendicular to the first plate 152 such that a substantially 'L-shaped' profile of the adaptor body 150 is formed, in a side view of the adaptor body 150. In accordance with the present disclosure, the first plate 152 of the adaptor body 150 defines first apertures 156 therein, for example, two first apertures 156, as shown in FIG. 5. The first plate 152 of the adaptor body 150 is adapted to be coupled to the corresponding clamp jaw 110 via fasteners 157 inserted through the first apertures 156 in the first plate 152 of the adaptor body 150. In an embodiment, the clamp jaw 110 may also define holes for receiving the said fasteners 157 for coupling the adaptor body 150 with the clamp jaw 110. In another embodiment, the clamp jaw 110 may include vertical protruding ribs, having structure similar to that of a bolt, which may pass through the first apertures 156 of the adaptor body 150 and subsequently secured by a corresponding nut, for coupling the adaptor body 150 with the clamp jaw 110.

In accordance with the present disclosure, the first apertures 156 in the first plate 152 of the adaptor body 150 are slots. The first apertures 156 in the first plate 152 of the adaptor body 150 facilitate moving the corresponding clamp jaw 110 with respect to the adaptor body 150, upon tightening and loosening of the mounting fasteners 102. For instance, upon tightening of the mounting fasteners 102, the fasteners 157 that couple the adaptor body 150 to the clamp jaw 110, and accordingly the clamp jaw 110, may move, from a radial outer position to a radial inner position, toward the monopole 10. Similarly, upon loosening of the mounting fasteners 102, the fasteners 157 that couple the adaptor body 150 to the clamp jaw 110, and accordingly the clamp jaw 110, may move away from the radial inner position to the radial outer position.

Further, the second plate 154 of the adaptor body 150 defines second apertures 158 therein. The second plate 154 of the adaptor body 150 is adapted to be coupled to the corresponding antenna 10A via fasteners 159 inserted through the second apertures 158 in the second plate 154 of the adaptor body 150. In an embodiment, the second apertures 158 in the second plate 154 of the adaptor body 150 are slots, holes or protuberances. Further, without deviating from the scope of the present disclosure, the antenna 10A may include vertical protruding ribs, having structure similar to that of a bolt, which may pass through the second apertures 158 of the adaptor body 150 and subsequently secured by a corresponding nut, for coupling the antenna 10A with the adaptor body 150. In other embodiment, the antenna 10A may include other mounting means engageable with the second apertures 158 of the adaptor body 150 for coupling the antenna 10A with the adaptor body 150.

Within the scope of the present disclosure, referring to FIG. 1, first, second and third antennas 10A, for example base station antennas, are adapted to be mounted to the respective first, second and third adaptor bodies 150A, 150B, 150C of the mounting bracket 100. Further, said first, second and third adaptor bodies 150A, 150B, 150C (that are respectively coupled to the first, second and third antennas 10A) are adapted to be coupled to the respective first, second and third clamp jaws 110A, 110B, 110C of the mounting bracket 100 that are clamped/mounted to the monopole 10.

For mounting the first, second and third antennas 10A on the monopole 10 using the mounting bracket 100 of the present disclosure, the first, second and third clamp jaws 110A, 110B, 110C are mounted on the monopole 10 by way of the mounting fasteners 102 (by tightening or loosening the mounting fasteners 102 according to the diameter of the monopole 10). Wherever applicable, two mounting brackets 100 may be employed for mounting the top ends and the bottom ends of the antennas 10A on the monopole 10.

Thereafter, the first, second and third antennas 10A are coupled to the respective first, second and third adaptor body 150A, 150B, 150C, by way of inserting the fasteners 159 through the second apertures 158 of the second plate 154 of the adaptor body 150. Further, the first, second and third adaptor bodies 150A, 150B, 150C (that are respectively coupled to the first, second and third antennas 10A) are coupled to the respective first, second and third clamp jaws 110A, 110B, 110C of the mounting bracket 100 by way of inserting fasteners 157 through the first apertures 156 in the first plate 152 of the adaptor body 150. In case of two mounting brackets 100 for mounting the antennas 10A on the monopole 10, the adaptor bodies 150A, 150B, 150C of the first mounting bracket 100 are coupled to the top ends of the antennas 10A and the adaptor bodies 150A, 150B, 150C of the second mounting bracket 100 are coupled to the bottom ends of the antennas 10A. Said adaptor bodies 150A, 150B, 150C are then coupled to the corresponding clamp jaws 110A, 110B, 110C of the respective mounting bracket 100.

In accordance with the present disclosure, the mounting bracket 100 can offer a smaller outer diameter of a tri-sector antenna mount kit/shroud compared to the conventional mounting brackets for tri-sector antennas. Also, the mounting bracket 100 of the present disclosure has less weight compared to known conventional mounting brackets and offers about 55% weight reduction. The mounting bracket 100 can be used with various pole diameters ranging from 3.5" to 6.625".

Further, the mounting bracket 100 of the present disclosure can eliminate the requirement of hexagonal plates and thus may require fewer components, and accordingly, may offer cost reduction due to less inventory.

Figure 7:
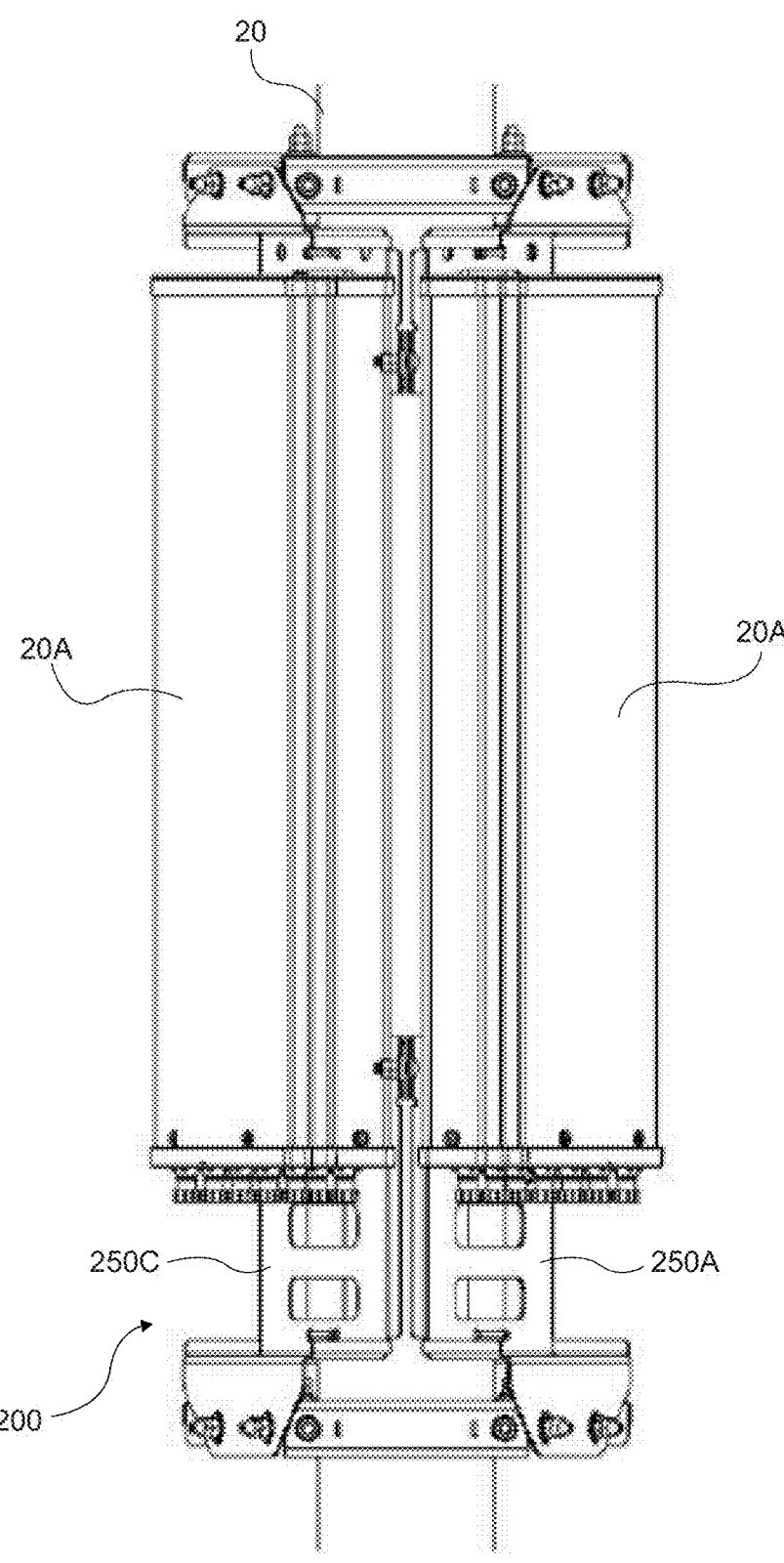
FIG. 7 is a side view of an exemplary tri-sector antenna assembly mounted on a monopole by a mounting bracket, in accordance with a second embodiment of the present disclosure.

FIG. 7 is a side view of an exemplary mounting bracket 200, according to a second embodiment of the present disclosure, that has been utilized for mounting three antennas 20A, for example, three base station antennas, to a support structure 20, for example, a monopole 20. The support structure 20 may be defined as a pole, or any similar vertical structure rigidly fixed to a surface. The mounting bracket 200 comprises a plurality of clamp jaws 210, for example two clamp jaws 210A, 210B, and each clamp jaw 210 is adapted to connect to a rear surface of a respective antenna 20A. Without deviating from the scope of the present disclosure, the mounting bracket 200 is adapted to be coupled to a top end or a bottom end of the antennas 20A. In the illustrated exemplary embodiment of FIG. 7, two mounting brackets 200 are shown, one of which is connected to the top end of the antennas 20A and the other is connected to the bottom end of the antennas 20A. In accordance with the present disclosure, the mounting brackets 200 are removably connected to the antennas 20A.

Figure 8:
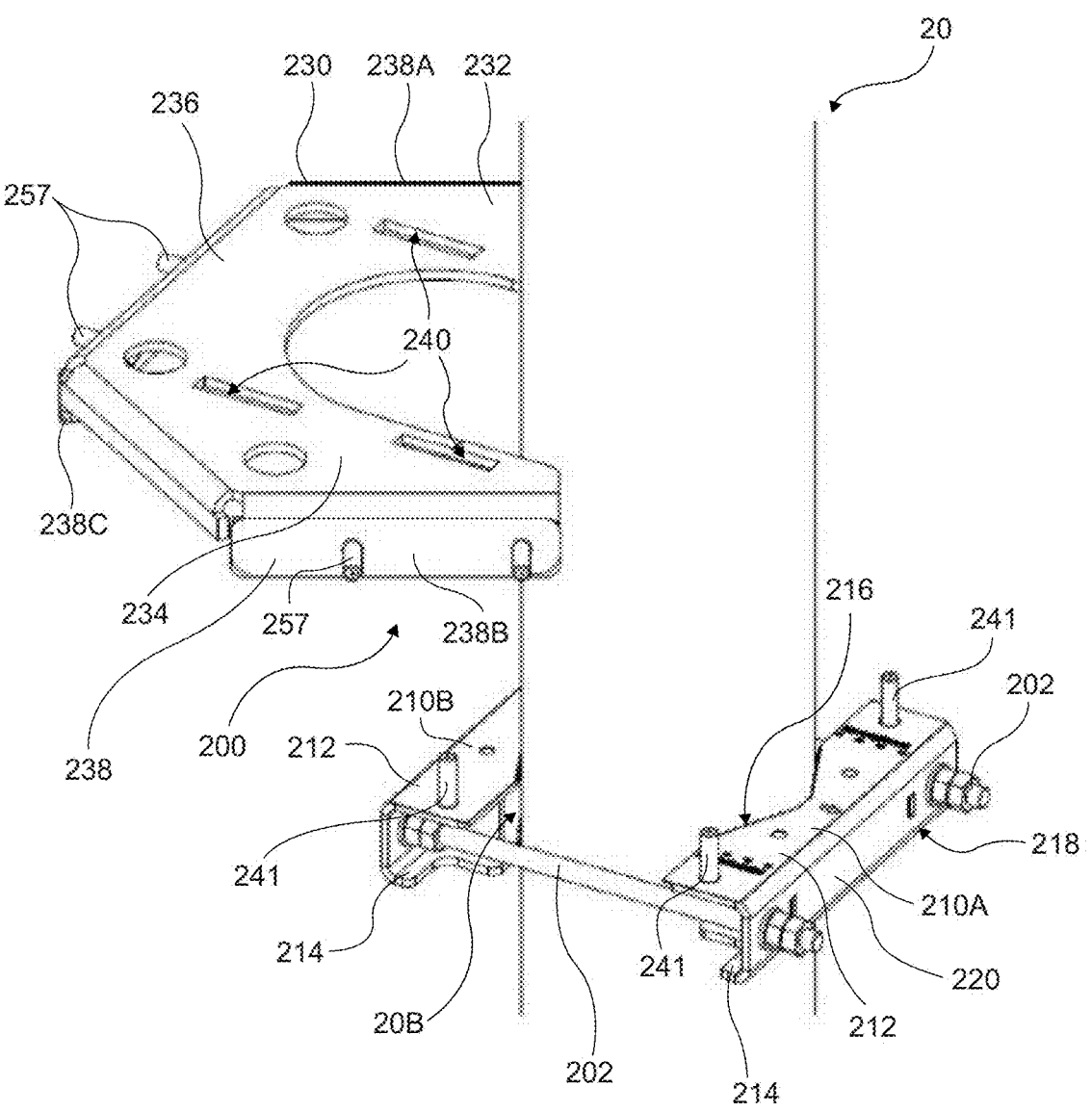
FIG. 8 is an exploded view of clamp jaws and a hex plate of the mounting bracket of FIG. 7 disposed around the monopole, in accordance with an embodiment of the present disclosure.
Figure 9:
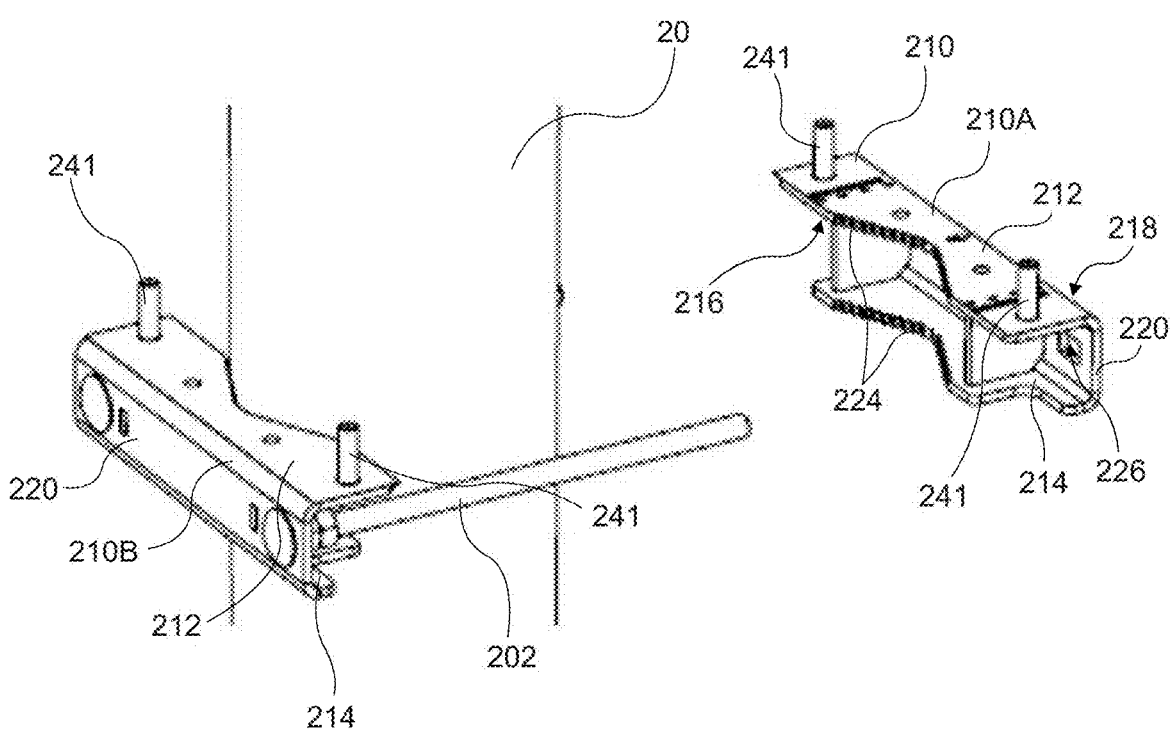
FIG. 9 is an exploded view of the clamp jaws of FIG. 9 disposed around the monopole, in accordance with an embodiment of the present disclosure.

FIG. 8 illustrates the perspective view of parts of the mounting bracket 200, for example, clamp jaws 210, 210A, 210B and a hex plate 230. As shown in FIGS. 7, 8 and 9, the mounting bracket 200 comprises two clamp jaws 210A, 210B that are adapted to be arranged around the monopole 20 and are adapted to be adjustably couplable with each other in order to clamp and unclamp the monopole 20. The mounting bracket 200 further comprises a plurality of mounting fasteners 202, for example two mounting fasteners 202, as shown in FIGS. 8 and 9. The mounting fasteners 202 are configured to extend through the clamp jaws 210A, 210B. The mounting fasteners 202 are configured to be tightened and loosened to move the two clamp jaws 210A, 210B toward and away from each other, respectively. For example, the mounting fasteners 202 may be tightened such that the clamp jaws 210A, 210B move toward each other and toward the monopole 20 in order to clamp the monopole 20. Similarly, the mounting fasteners 202 may be loosened such that the clamp jaws 210A, 210B are free to move away from each other and away from the monopole 20 in order to unclamp the monopole 20. Further, the hex plate 230 is adapted to be disposed above and coupled to the two clamp jaws 210A, 210B. The clamp jaws 210A, 210B are movable with respect to the hex plate 230.

Figure 10:
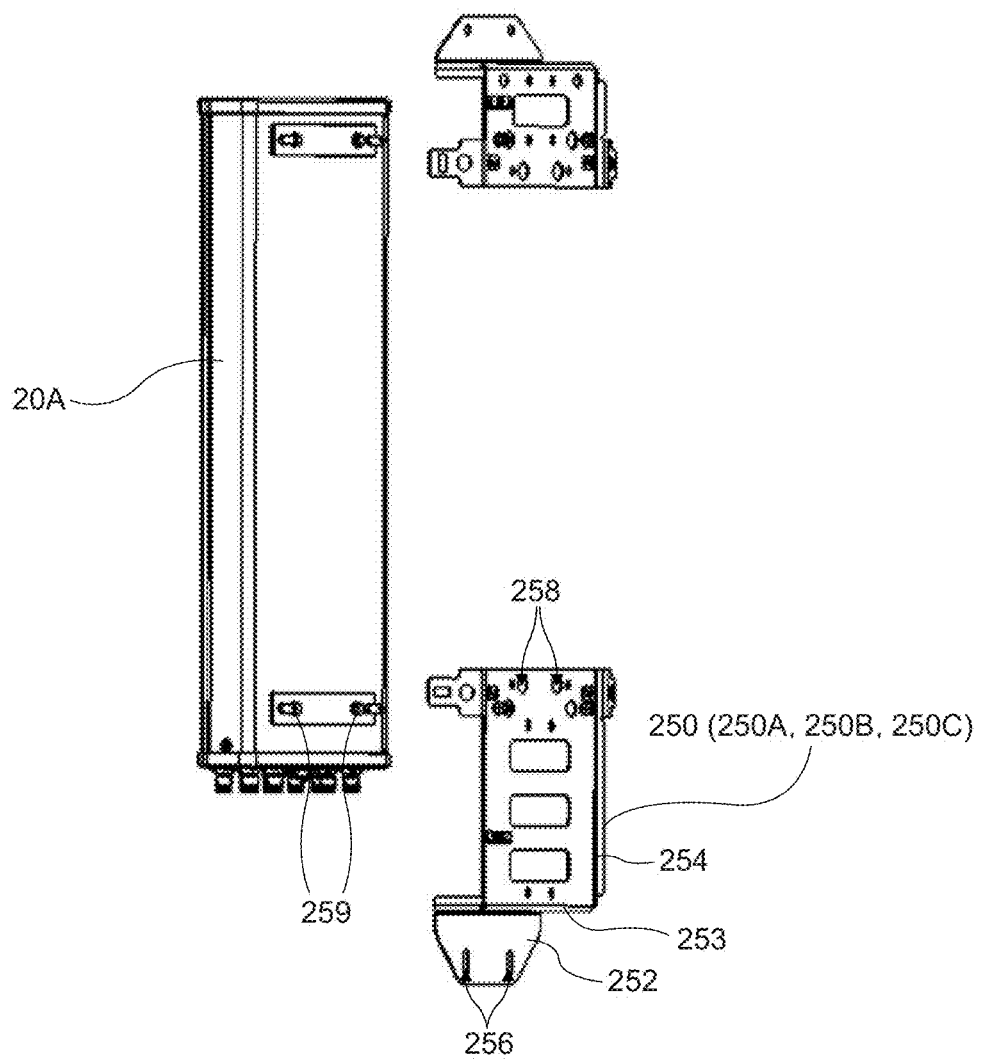
FIG. 10 is an exploded view of an exemplary antenna and adaptor bodies of the mounting bracket of FIG. 7, in accordance with an embodiment of the present disclosure.

With reference to FIGS. 7 and 10, the mounting bracket 200 further comprises three adaptor bodies 250, 250A, 250B, 250C, wherein each adaptor body 250 of the three adaptor bodies 250A, 250B, 250C is configured to couple the antenna 20A to the hex plate 230 of the mounting bracket 200. In accordance with the present disclosure, a first portion of the adaptor body 250 is adapted to be coupled to the hex plate 230 and a second portion of the adaptor body 250 is adapted to be coupled to the antenna 20A.

Referring again to FIGS. 8 and 9, each clamp jaw 210 of the two clamp jaws 210A, 210B comprises a first plate 212 and a second plate 214 arranged below the first plate 212. The first plate 212 and the second plate 214 have a first end 216 and a second end 218 opposite to the first end 216. The clamp jaw 210 further comprises a backplate 220 that extends from the second end 218 of the first plate 212 to the second end 218 of the second plate 214 such that the backplate 220 couples the first plate 212 to the second plate 214. Further, the first plate 212 and the second plate 214 of each clamp jaw 210 define a toothed concave edge 224 at the first ends 216 of the first plate 212 and the second plate 214. Without deviating from the scope of the present disclosure, the toothed concave edges 224 of the first plate 212 and the second plate 214 are adapted to engage and grip the support structure/monopole 20 for clamping the mounting bracket 200 on the monopole 20, as shown in FIG. 9. In accordance with the present disclosure, the backplate 220 of each clamp jaw 210 defines holes 226 therein that are adapted to receive the mounting fasteners 202 for arranging the clamp jaws 210A, 210B around the monopole 20 and adjustably coupling the clamp jaws 210A, 210B with each other.

Still referring to FIGS. 8 and 9, the mounting bracket 200 comprises two mounting fasteners 202. The mounting fasteners 202 are configured to extend through the holes 226 defined in the backplate 220 of the adjacent clamp jaws 210A, 210B in order to adjustably couple the clamp jaws 210A, 210B around the monopole 20. As explained in the preceding paragraphs, the mounting fasteners 202 are configured to be tightened and loosened to the move the clamp jaws 210A, 210B toward and away from each other, respectively. For example, the mounting fasteners 202 may be tightened such that the clamp jaws 210A, 210B move toward each other and toward the monopole 20 in order to clamp the monopole 20. Similarly, the mounting fasteners 202 may be loosened such that the clamp jaws 210A, 210B are free to move and may be moved away from each other and away from the monopole 20 in order to unclamp the monopole 20. In an embodiment of the present disclosure, the mounting fasteners 202 comprise nut and bolt arrangements. In another embodiment, the mounting fasteners 202 may comprise a combination of a nut, a bolt, a cushion or split washer, and a washer for effective fastening of the clamp jaws 210A, 210B of the mounting bracket 200 around the monopole 20. In an embodiment of the present disclosure, the mounting fasteners 202 may be tightened and/or loosened such that a monopole receiving space 20B created between the toothed concave edges 224 of the clamp jaws 210A, 210B can be varied to accommodate the monopole 20 of different diameters. For example, the mounting bracket 200 is adjustable to accommodate monopoles having a diameter varying in a range of 3.5 inches to 6.625 inches.

Referring to FIG. 8, the hex plate 230 of the mounting bracket 200 is disclosed. The hex plate 230 has a first arm 232, a second arm 234 and a spine 236 spanning the first arm 232 and the second arm 234. The first arm 232, the second arm 234 and the spine 236 are connected to each other to create the monopole receiving space 20B. Each of the first arm 232 and the second arm 234 is generally an elongated triangle. One edge of the first arm 232 and the second arm 234 has a flange 238, i.e., a first flange 238A and a second flange 238B, that extends downwardly. The spine 236 extends between the rear ends of the first arm 232 and the second arm 234. Further, a third flange 238C extends downwardly from the outward edge of the spine 236. In an embodiment, the first, second and third flanges 238A, 238B, 238C are spaced substantially circumferentially equidistant from each other. As a result, the three antennas 20A mounted to each of the first, second and third flanges 238A, 238B, 238C are separated from each other by approximately 120 degrees.

The hex plate 230 may be fastened to the clamp jaws 210A, 210B by positioning the monopole 20 in the monopole receiving space 20B, inserting the fasteners 241 through apertures 240 defined in the first arm 232 and the second arm 234, and tightening the fasteners 241. In an embodiment of the present disclosure, the apertures 240 in the first arm 232 and the second arm 234 of the hex plate 230 are slots. Further, the hex plate 230 may comprise two slots in each of the first arm 232 and the second arm 234. Furthermore, the slots in the first arm 232 may be collinear, and the slots in the second arm 234 may be collinear. Without deviating from the scope of the present disclosure, the apertures 240 in the first arm 232 and the second arm 234 of the hex plate 230 facilitate moving the two clamp jaws 210A, 210B with respect to the hex plate 230. The apertures 240 in the hex plate 230 facilitate moving the clamp jaws 210A, 210B with respect to the hex plate 230, upon tightening and loosening of the mounting fasteners 202. For instance, upon tightening of the mounting fasteners 202, the fasteners 241 that couple the hex plate 230 to the clamp jaws 210A, 210B, and accordingly the clamp jaws 210A, 210B, may move, from a radial outer position to a radial inner position, toward the monopole 20. Similarly, upon loosening of the mounting fasteners 202, the fasteners 241 that couple the hex plate 230 to the clamp jaws 210A, 210B, and accordingly the clamp jaws 210A, 210B, may move away from the radial inner position to the radial outer position.

With reference to FIGS. 7 and 10, the mounting bracket 200 further comprises three adaptor bodies 250A, 250B, 250C. Each adaptor body 250 of the three adaptor bodies 250A, 250B, 250C is configured to couple the corresponding antenna 20A to a respective flange 238 of the hex plate 230. As shown in FIG. 10, the adaptor body 250 comprises a first plate 252 and a second plate 254. The second plate 254 is arranged substantially parallel to the first plate 252 and the second plate 254 is connected to the first plate 252 by a third plate 253. In accordance with the present disclosure, the first plate 252 of the adaptor body 250 defines first apertures 256 therein, for example, two first apertures 256, as shown in FIG. 10. The first plate 252 of the adaptor body 250 is adapted to be coupled to the corresponding third, second or third flange 238A, 238B, 238C of the hex plate 230 via fasteners 257 inserted through the first apertures 256 in the first plate 252 of the adaptor body 250. In an embodiment, the flanges 238A, 238B, 238C of the hex plate 230 may also define holes for receiving the said fasteners 257 for coupling the adaptor body 250 with the hex plate 230. In an embodiment, the first apertures 256 in the first plate 152 of the adaptor body 250 are slots.

Further, the second plate 154 of the adaptor body 250 defines second apertures 258 therein. The second plate 254 of the adaptor body 150 is adapted to be coupled to the corresponding antenna 20A via fasteners 259 inserted through the second apertures 258 in the second plate 254 of the adaptor body 250. In an embodiment, the second apertures 258 in the second plate 254 of the adaptor body 250 are slots, holes or protuberances. Further, without deviating from the scope of the present disclosure, the antenna 20A may include vertical protruding ribs, having structure similar to that of a bolt, which may pass through the second apertures 258 of the adaptor body 250 and subsequently secured by a corresponding nut, for coupling the antenna 20A with the adaptor body 250. In other embodiment, the antenna 20A may include other mounting means engageable with the second apertures 258 of the adaptor body 250 for coupling the antenna 20A with the adaptor body 250.

Within the scope of the present disclosure, referring to FIG. 7, first, second and third antennas 20A, for example base station antennas, are adapted to be mounted to the respective first, second and third adaptor bodies 250A, 250B, 250C of the mounting bracket 200. Further, said first, second and third adaptor bodies 250A, 250B, 250C (that are respectively coupled to the first, second and third antennas 20A) are adapted to be coupled to the respective first, second and third flanges 238A, 238B, 238C of the hex plate 230 of the mounting bracket 200 that are clamped/mounted to the monopole 20.

For mounting the first, second and third antennas 20A on the monopole 20 using the mounting bracket 200 of the present disclosure, the clamp jaws 210A, 210B and the hex plate 230 are mounted on the monopole 20 by way of the mounting fasteners 202 (by tightening or loosening the mounting fasteners 202 according to the diameter of the monopole 20). Wherever applicable, two mounting brackets 200 may be employed for mounting the top ends and the bottom ends of the antennas 20A on the monopole 20.

Thereafter, the first, second and third antennas 20A are coupled to the respective first, second and third adaptor bodies 250A, 250B, 250C, by way of inserting the fasteners 259 through the second apertures 258 of the second plate 254 of the adaptor body 250. Further, the first, second and third adaptor bodies 250A, 250B, 250C (that are respectively coupled to the first, second and third antennas 20A) are coupled to the respective first, second and third flanges 238A, 238B, 238C of the hex plate 230 of the mounting bracket 200 by way of inserting the fasteners 257 through the first apertures 256 in the first plate 252 of the adaptor body 250. In case of two mounting brackets 200 for mounting the antennas 20A on the monopole 20, the adaptor bodies 250A, 250B, 250C of the first mounting bracket 200 are coupled to the top ends of the antennas 20A and the adaptor bodies 250A, 250B, 250C of the second mounting bracket 200 are coupled to the bottom ends of the antennas 20A. Said adaptor bodies 250A, 250B, 250C are then coupled to the corresponding clamp jaws 210A, 210B of the respective mounting bracket 200.

A person skilled in the art can readily contemplate that the apertures 156, 158, 240, 256, 258 of the mounting bracket 100, 200 may include indicia (e.g., numbered graduated lines or the like) that indicate where the fasteners/bolts and nuts should be positioned for a monopole 10, 20 of a particular diameter.

In accordance with the present disclosure, the mounting bracket 200 can offer a smaller outer diameter of a tri-sector antenna mount kit/shroud compared to the conventional mounting brackets for tri-sector antennas. Also, the mounting bracket 200 of the present disclosure has less weight compared to known conventional mounting brackets and offers about 45% weight reduction. The mounting bracket 200 can be used with various pole diameters ranging from 3.5" to 6.625".

Further, the mounting bracket 200 of the present disclosure requires fewer components, and accordingly, can offer cost reduction due to less inventory. Also, the mounting bracket 200 facilitates case of assembly and case of access to the hardware.

The various embodiments of the present disclosure have been described above with reference to the accompanying drawings. The present disclosure is not limited to the illustrated embodiments; rather, these embodiments are intended to fully and completely disclose the subject matter of the disclosure to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for case of description to describe one element or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Herein, the terms "attached", "connected", "interconnected", "contacting", "mounted", "coupled" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

REFERENCE NUMERALS

| PARTICULARS | REFERRAL NUMERAL |
| --- | --- |
| Support Structure/Monopole | 10 |
| Antenna | 10A |
| Monopole Receiving Space | 10B |
| Mounting Bracket | 100 |
| Mounting Fasteners | 102 |
| Clamp Jaw | 110 |
| Clamp Jaw | 110A |
| Clamp Jaw | 110B |

-continued

| PARTICULARS | REFERRAL NUMERAL |
| --- | --- |
| Clamp Jaw | 110C |
| First Plate | 112 |
| Second Plate | 114 |
| First End | 116 |
| Second End | 118 |
| Backplate | 120 |
| Flanges | 122 |
| Toothed Concave Edge | 124 |
| Holes | 126 |
| Adaptor Body | 150 |
| Adaptor Body | 150A |
| Adaptor Body | 150B |
| Adaptor Body | 150C |
| First Plate | 152 |
| Second Plate | 154 |
| First Apertures | 156 |
| Fasteners | 157 |
| Second Apertures | 158 |
| Fasteners | 159 |
| Support Structure/Monopole | 20 |
| Antenna | 20A |
| Monopole Receiving Space | 20B |
| Mounting Bracket | 200 |
| Mounting Fasteners | 202 |
| Clamp Jaw | 210 |
| Clamp Jaw | 210A |
| Clamp Jaw | 210B |
| First Plate | 212 |
| Second Plate | 214 |
| First End | 216 |
| Second End | 218 |
| Backplate | 220 |
| Toothed Concave Edge | 224 |
| Holes | 226 |
| Hex Plate | 230 |
| First Arm | 232 |
| Second Arm | 234 |
| Spine | 236 |
| Flange | 238 |
| First Flange | 238A |
| Second Flange | 238B |
| Third Flange | 238C |
| Apertures | 240 |
| Fasteners | 241 |
| Adaptor Body | 250 |
| Adaptor Body | 250A |
| Adaptor Body | 250B |
| Adaptor Body | 250C |
| First Plate | 252 |
| Third Plate | 253 |
| Second Plate | 254 |
| First Apertures | 256 |
| Fasteners | 257 |
| Second Apertures | 258 |
| Fasteners | 259 |

EQUIVALENTS

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

What is claimed is:

1. A mounting bracket for an antenna, the mounting bracket comprising:
   three clamp jaws adapted to be arranged around a monopole and adjustably couplable with each other to clamp and unclamp the monopole, each of the three clamp jaws comprising:
   a first plate;
   a second plate; and
   a backplate that couples the first plate to the second plate and defines holes therein;
   three mounting fasteners, each mounting fastener of the three mounting fasteners adapted to extend through corresponding holes of the adjacent clamp jaws and configured to be tightened or loosened to move the three clamp jaws toward or away from each other, respectively; and
   three adaptor bodies, each adaptor body of the three adaptor bodies comprises a first plate and a second plate coupled to the first plate,
   wherein the first plate of the adaptor body defines first apertures therein and is couplable to a corresponding clamp jaw via adaptor fasteners inserted through the first apertures in the first plate of the adaptor body,
   wherein the first plate and the second plate of the three clamp jaws each define a toothed concave edge.

2. The mounting bracket as claimed in claim 1, wherein the first apertures in the first plate of the adaptor body are slots.

3. The mounting bracket as claimed in claim 1, wherein the first apertures in the first plate of the adaptor body facilitate moving the corresponding clamp jaw with respect to the adaptor body upon tightening and loosening of the mounting fasteners.

4. The mounting bracket as claimed in claim 1, wherein the second plate of the adaptor body defines second apertures and is adapted to be coupled to the antenna via adaptor fasteners inserted through the second apertures in the second plate of the adaptor body.

5. The mounting bracket as claimed in claim 4, wherein the second apertures in the second plate of the adaptor body are slots, holes, or protuberances.

6. The mounting bracket as claimed in claim 1, wherein the mounting fasteners comprise nut and bolt arrangements.

7. The mounting bracket as claimed in claim 1, in combination with first, second and third antennas mounted to, respectively, one of the three adaptor bodies of the mounting bracket.

8. The mounting bracket as claimed in claim 7, wherein the combination of the mounting bracket and the first, second, and third antennas is in further combination with the monopole, the three clamp jaws engaging the monopole.

9. The mounting bracket as claimed in claim 1, wherein each of the three clamp jaws is a triangular clamp jaw in which the first plate and the second plate of the three clamp jaws define a toothed concave edge.

10. The mounting bracket as claimed in claim 9, wherein the backplate of each of the three clamp jaws comprises two outwardly extending flanges that define the holes for receiving the mounting fasteners.

11. The mounting bracket as claimed in claim 1, wherein the mounting bracket is adjustable to accommodate monopoles having a diameter varying in a range of 3.5 inches to 6.625 inches.

12. An antenna assembly, the antenna assembly comprising:
   a monopole;
   three antennas; and
   a mounting bracket assembly, the mounting bracket assembly comprising:
   a clamping assembly comprising three clamp jaws arranged around the monopole;
   three mounting fasteners, each mounting fastener extending through corresponding holes of adjacent clamp jaws to secure the clamp jaws around the monopole; and
   three adaptor bodies, each adaptor body coupled to an upper surface of a respective clamp jaw and configured to be secured to an adjacent adaptor body,
   wherein each antenna is secured to a respective adapter body of the mounting bracket assembly.

13. The antenna assembly as claimed in claim 12, wherein the clamp jaws are adjustably couplable with each other to clamp and unclamp the mounting bracket assembly to the monopole.

14. The antenna assembly as claimed in claim 12, wherein each adaptor body comprises a first plate and a second plate coupled to the first plate, the first plate defines first apertures therein and is couplable to a corresponding clamp jaw via fasteners inserted through the first apertures in the first plate of the adaptor body.

15. The antenna assembly as claimed in claim 12, wherein each mounting fastener is configured to be tightened or loosened to move the three clamp jaws toward or away from each other, respectively.

16. The antenna assembly as claimed in claim 12, wherein each of the three clamp jaws comprise a first plate, a second plate, and a backplate that couples the first plate to the second plate and defines holes therein.

17. A mounting bracket for an antenna, the mounting bracket comprising:

a clamping assembly, the clamping assembly comprising three clamp members adapted to be arranged around a monopole, each clamp member adjustably coupled to the adjacent clamping members to clamp and unclamp the monopole; and three adaptor members, each adaptor member comprises a first plate and a second plate coupled to the first plate, the second plate arranged substantially perpendicular to the first plate, wherein the first plate of each adaptor member defines at least two apertures therein and is couplable to a corresponding clamp member via respective fasteners inserted through each of the apertures in the first plate of the respective adaptor member, the fasteners configured to traverse within the respective apertures, thereby allowing radial movement of the adaptor member relative to the monopole.

18. The mounting bracket as claimed in claim 17, each of the three clamp members comprising, a first plate, a second plate, and a backplate that couples the first plate to the second plate.

19. The mounting bracket as claimed in claim 17, further comprising three mounting fasteners, each mounting fastener adapted to extend through corresponding holes of the adjacent clamp members and configured to be tightened or loosened to move the three clamp members toward or away from each other, respectively.

*　*　*　*　*